United States Patent
McColl et al.

(10) Patent No.: US 12,489,382 B2
(45) Date of Patent: Dec. 2, 2025

(54) ADAPTIVE TRIGGER MAPPING

(71) Applicant: MILWAUKEE ELECTRIC TOOL CORPORATION, Brookfield, WI (US)

(72) Inventors: Parker McColl, Menomonee, WI (US); Troy C. Thorson, Cedarburg, WI (US); Jonathan E. Abbott, Milwaukee, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 105 days.

(21) Appl. No.: 18/065,227

(22) Filed: Dec. 13, 2022

(65) Prior Publication Data
US 2023/0188064 A1    Jun. 15, 2023

Related U.S. Application Data
(60) Provisional application No. 63/289,904, filed on Dec. 15, 2021.

(51) Int. Cl.
*H02P 7/22* (2006.01)
*B25F 5/02* (2006.01)

(52) U.S. Cl.
CPC . *H02P 7/22* (2013.01); *B25F 5/02* (2013.01)

(58) Field of Classification Search
CPC .................................... H02P 7/22; B25F 5/02
USPC .......................................................... 318/17
See application file for complete search history.

(56) References Cited

U.S. PATENT DOCUMENTS

| | | | |
|---|---|---|---|
| 6,260,427 B1 | 7/2001 | Jones et al. | |
| 11,221,611 B2 | 1/2022 | Abbott et al. | |
| 11,366,457 B1 | 6/2022 | George et al. | |
| 2003/0037423 A1 | 2/2003 | Siegel | |
| 2004/0024487 A1* | 2/2004 | Uhlich | G05B 19/4103 700/252 |
| 2005/0167130 A1 | 8/2005 | Setter et al. | |
| 2006/0289183 A1 | 12/2006 | Schreiber | |
| 2008/0021590 A1 | 1/2008 | Vanko et al. | |
| 2010/0114358 A1 | 5/2010 | Krapf et al. | |
| 2013/0187587 A1 | 7/2013 | Knight et al. | |
| 2013/0327552 A1 | 12/2013 | Lovelass et al. | |

(Continued)

FOREIGN PATENT DOCUMENTS

| CN | 118393861 A | 7/2024 |
|---|---|---|
| CN | 118393862 A | 7/2024 |

(Continued)

OTHER PUBLICATIONS
Sheeks et al. (CN 111133662 A) High Power Battery Power Supply System Date Published May 8, 2020 (Year: 2020).*

(Continued)

*Primary Examiner* — Jorge L Carrasquillo
(74) *Attorney, Agent, or Firm* — Quarles & Brady LLP

(57) ABSTRACT

A power tool including a housing, a trigger, a motor coupled to an output member, and a motor drive circuit coupled to the motor. The power tool further includes a motor controller coupled to the motor drive circuit. The motor control circuit is configured to detect a position change of the trigger, determine one or more parameters associated with the position change, and generate an output based on the one or more determined parameters and a variable trigger mapping function. The output is then output to the motor drive circuit.

18 Claims, 11 Drawing Sheets

(56) References Cited

U.S. PATENT DOCUMENTS

| | | |
|---|---|---|
| 2014/0338939 A1 | 11/2014 | Shi |
| 2014/0367134 A1 | 12/2014 | Phillips et al. |
| 2015/0101835 A1 | 4/2015 | Nitsche et al. |
| 2015/0178620 A1 | 6/2015 | Ascari et al. |
| 2016/0000025 A1 | 1/2016 | Hamann et al. |
| 2016/0342142 A1 | 11/2016 | Boeck et al. |
| 2016/0361069 A1 | 12/2016 | Ardel et al. |
| 2016/0375570 A1 | 12/2016 | Boeck et al. |
| 2017/0090430 A1 | 3/2017 | Nakazawa |
| 2018/0328797 A1 | 11/2018 | Gwon et al. |
| 2018/0354108 A1* | 12/2018 | Lee .................. B25B 21/00 |
| 2019/0187659 A1 | 6/2019 | Li et al. |
| 2019/0227528 A1 | 7/2019 | Abbott et al. |
| 2019/0318616 A1* | 10/2019 | Matson ............. H04L 67/306 |
| 2020/0156210 A1 | 5/2020 | Sullivan et al. |
| 2020/0160152 A1 | 5/2020 | Buttner et al. |
| 2020/0267903 A1 | 8/2020 | Gao et al. |
| 2020/0276680 A1 | 9/2020 | Green et al. |
| 2020/0326718 A1 | 10/2020 | Kandemir et al. |
| 2020/0338677 A1 | 10/2020 | Ozeki |
| 2020/0384618 A1 | 12/2020 | Tanji et al. |
| 2021/0053212 A1 | 2/2021 | Haetty |
| 2021/0101263 A1 | 4/2021 | Hwang et al. |
| 2021/0101304 A1 | 4/2021 | Green et al. |
| 2021/0104006 A1 | 4/2021 | Green |
| 2021/0157297 A1 | 5/2021 | Kaiser et al. |
| 2021/0166154 A1 | 6/2021 | Ogino |
| 2021/0192386 A1 | 6/2021 | Cabrita et al. |
| 2021/0205976 A1 | 7/2021 | Matei |
| 2021/0240145 A1 | 8/2021 | Abbott |
| 2021/0302921 A1 | 9/2021 | Kolter et al. |
| 2021/0312262 A1 | 10/2021 | Postel |
| 2021/0326663 A1 | 10/2021 | Winston et al. |
| 2021/0374549 A1 | 12/2021 | Willmott et al. |
| 2021/0383234 A1 | 12/2021 | Bai et al. |
| 2021/0393337 A1 | 12/2021 | Zucker |
| 2021/0394344 A1 | 12/2021 | Mueckl et al. |
| 2022/0019900 A1 | 1/2022 | Wong et al. |
| 2022/0050023 A1 | 2/2022 | Lavazais et al. |
| 2022/0067913 A1 | 3/2022 | Lutz et al. |
| 2022/0092466 A1 | 3/2022 | Carbrita et al. |
| 2022/0100850 A1 | 3/2022 | Sun et al. |
| 2022/0101116 A1 | 3/2022 | Sheikholeslami et al. |
| 2022/0101143 A1 | 3/2022 | Rice et al. |
| 2022/0108132 A1 | 4/2022 | Zhang et al. |
| 2022/0111496 A1 | 4/2022 | Beacham, Jr. et al. |
| 2022/0118595 A1 | 4/2022 | Abbott et al. |
| 2022/0121177 A1 | 4/2022 | Kerwin |
| 2022/0138510 A1 | 5/2022 | Dai et al. |
| 2022/0138511 A1 | 5/2022 | Xu et al. |
| 2022/0172061 A1 | 6/2022 | Willmott et al. |
| 2022/0197227 A1 | 6/2022 | Woehlke et al. |
| 2022/0261618 A1 | 8/2022 | Garcia et al. |
| 2022/0266429 A1 | 8/2022 | Erbele et al. |
| 2022/0292349 A1 | 9/2022 | Stoll et al. |
| 2022/0299946 A1 | 9/2022 | Abbott et al. |
| 2022/0313374 A1 | 10/2022 | Jacobsen et al. |
| 2022/0318616 A1 | 10/2022 | Kamble et al. |
| 2022/0347811 A1 | 11/2022 | Abbott et al. |
| 2022/0405648 A1 | 12/2022 | Lin et al. |
| 2022/0407274 A1 | 12/2022 | Radtke et al. |
| 2022/0410360 A1 | 12/2022 | Erbele et al. |
| 2023/0039379 A1 | 2/2023 | Schmidt |
| 2023/0057100 A1 | 2/2023 | Schirmer et al. |
| 2023/0100132 A1 | 3/2023 | Rice et al. |
| 2023/0100765 A1 | 3/2023 | Roderick et al. |
| 2023/0101812 A1 | 3/2023 | Feng et al. |
| 2023/0102866 A1 | 3/2023 | Bai et al. |
| 2023/0107463 A1 | 4/2023 | Baharloui et al. |
| 2023/0107917 A1 | 4/2023 | Pabbaraju et al. |
| 2023/0115313 A1 | 4/2023 | Weber et al. |
| 2023/0115521 A1 | 4/2023 | Kupcsik et al. |
| 2023/0141816 A1 | 5/2023 | Butzerin et al. |
| 2023/0219204 A1 | 7/2023 | Dieter et al. |
| 2023/0251614 A1 | 8/2023 | Lutz et al. |
| 2023/0298315 A1 | 9/2023 | Sheikholeslami et al. |
| 2023/0316067 A1 | 10/2023 | Rudolph et al. |
| 2023/0321796 A1 | 10/2023 | Speckman et al. |
| 2023/0339142 A1 | 10/2023 | Mayer et al. |
| 2023/0356341 A1 | 11/2023 | Volpert |
| 2023/0367269 A1 | 11/2023 | Glennon et al. |
| 2023/0406344 A1 | 12/2023 | Jiang et al. |
| 2024/0020638 A1 | 1/2024 | Adcock et al. |
| 2024/0037282 A1 | 2/2024 | Rice et al. |
| 2024/0037446 A1 | 2/2024 | Vogt et al. |
| 2024/0051107 A1 | 2/2024 | Petersson et al. |
| 2024/0070451 A1 | 2/2024 | Zhang et al. |
| 2024/0096067 A1 | 3/2024 | Mahmud et al. |
| 2024/0104339 A1 | 3/2024 | Norouzzadeh et al. |
| 2024/0112455 A1 | 4/2024 | He et al. |
| 2024/0139916 A1 | 5/2024 | Baskaran et al. |
| 2024/0149411 A1 | 5/2024 | Schuller et al. |
| 2024/0165774 A1 | 5/2024 | Bajpai |
| 2024/0190032 A1 | 6/2024 | Otto et al. |
| 2024/0198475 A1 | 6/2024 | Bralla et al. |
| 2024/0198506 A1 | 6/2024 | Leray et al. |
| 2024/0217082 A1 | 7/2024 | Abbott et al. |
| 2024/0256961 A1 | 8/2024 | Frischen et al. |
| 2024/0265262 A1 | 8/2024 | Elsken et al. |
| 2024/0326223 A1 | 10/2024 | Hayashi et al. |
| 2024/0333179 A1 | 10/2024 | Abbott et al. |
| 2024/0347286 A1 | 10/2024 | Abbott et al. |
| 2024/0367296 A1 | 11/2024 | Nakamura et al. |
| 2024/0369431 A1 | 11/2024 | Tang et al. |
| 2024/0369432 A1 | 11/2024 | Tang et al. |
| 2024/0370774 A1 | 11/2024 | Aldenfalk et al. |
| 2024/0395260 A1 | 11/2024 | Namata et al. |

FOREIGN PATENT DOCUMENTS

| | | |
|---|---|---|
| CN | 118393863 A | 7/2024 |
| CN | 118393864 A | 7/2024 |
| CN | 118393865 A | 7/2024 |
| CN | 118393866 A | 7/2024 |
| CN | 118393867 A | 7/2024 |
| CN | 118393869 A | 7/2024 |
| CN | 118393870 A | 7/2024 |
| DE | 102019131627 A1 | 5/2021 |
| DE | 102020205165 A1 | 10/2021 |
| DE | 102020213080 A1 | 4/2022 |
| DE | 102023200858 A1 | 8/2024 |
| EP | 1398119 A1 | 3/2004 |
| EP | 3623108 A1 | 3/2020 |
| EP | 3716160 A1 | 9/2020 |
| EP | 3770820 A1 | 1/2021 |
| EP | 3772398 A1 | 2/2021 |
| EP | 3913547 A1 | 11/2021 |
| EP | 3950230 A1 | 2/2022 |
| EP | 4357983 A1 | 4/2024 |
| JP | 2011101932 A | 5/2011 |
| JP | 2012-200807 A | 10/2012 |
| JP | 2018111187 A | 7/2018 |
| JP | 2022-153183 A | 10/2022 |
| WO | 2009/138268 A1 | 11/2009 |
| WO | 2017/162130 A1 | 9/2017 |
| WO | 2020/073955 A | 4/2020 |
| WO | 2021/042233 A1 | 3/2021 |
| WO | 2021/060090 A1 | 4/2021 |
| WO | 2021/241111 A1 | 12/2021 |
| WO | 2023/000659 A1 | 1/2023 |
| WO | 2023/076385 A2 | 5/2023 |
| WO | 2023/076953 A1 | 5/2023 |
| WO | 2023/076954 A1 | 5/2023 |
| WO | 2023/076955 A1 | 5/2023 |
| WO | 2023/110231 A1 | 6/2023 |
| WO | 2023/180247 A1 | 9/2023 |
| WO | 2023/186501 A1 | 10/2023 |
| WO | 2023/217792 A1 | 11/2023 |
| WO | 2023/222382 A1 | 11/2023 |
| WO | 2024/044660 A1 | 2/2024 |
| WO | 2024/099933 A1 | 5/2024 |

(56) References Cited

FOREIGN PATENT DOCUMENTS

| WO | 2024/140217 A1 | 7/2024 |
| WO | 2024/156515 A1 | 8/2024 |

OTHER PUBLICATIONS

Abbott et al. (WO 2019084280 A1) Kickback Control Methods for Power Tools Date Published May 2, 2019 (Year: 2019).*
International Search Report and Written Opinion for Application No. PCT/US2022/081428 dated Apr. 27, 2023 (10 pages).

* cited by examiner

ADAPTIVE TRIGGER MAPPING

RELATED APPLICATIONS

This application claims the benefit of U.S. Provisional Patent Application No. 63/289,904, filed Dec. 15, 2021, the entire content of which is hereby incorporated by reference.

FIELD

Embodiments described herein relate to a trigger or other user input for a power tool.

SUMMARY

Electrical devices, and power tools particularly, often have a user interface in the form of a trigger to control an output of the device, such as rotational speed. Traditionally, these triggers use various control mechanism to detect the movement of the trigger. For example, potentiometers, other variable resistors, variable capacitive/inductive systems, encoders, etc., may be used to determine the movement of the trigger. This input is often provided to a controller of the device using an analog-to-digital converter ("ADC") to convert the analog data into a digital value. The controller then generates an output based on the digital value. However, due to physical limitations of the trigger, there may be instances where the trigger must be depressed a certain amount before any output is generated. Additionally, a max limit for the trigger position may cause the output to reach a maximum value before the trigger is fully actuated to the mechanical limit. This can result in users having a difficult time judging the amount of pull required to achieve the desired result. Overshooting the desired output is also possible as a user may actuate the trigger more than needed due to the initial operational dead band.

Additionally, some triggers may exhibit hysteresis effects that differ depending on the type of actuation (e.g., pulling vs. releasing the trigger), wherein the position of the trigger equivalent to a desired output may not be the same depending on whether the trigger is being depressed or released. This may further result in the user having difficulty in achieving the desired output due to the non-standardization of the trigger position mapping to the output depending on the type of actuation, as well as employing additional trigger mapping techniques as described in detail below.

The below embodiments provide various trigger mapping techniques that address the issues with existing electronic device triggers by accounting for direction of trigger pull, varying sensitivity across trigger positions, Power tools described herein include a housing, a trigger, a motor coupled to an output member, a motor drive circuit coupled to the motor, and a motor controller coupled to the motor drive circuit. The motor controller is configured to detect a position change of the trigger, determine a distance and direction of the position change, generate an output using one or more hysteresis functions based on the determined distance and the determine direction, and transmit the output to the motor drive circuit to drive the motor.

In one aspect of the above embodiment, the one or more hysteresis functions include one of a linear function, a polynomial function, a piecewise function, a lookup table function, a discrete function, and a continuous function.

In another aspect, the motor controller is further configured to generate the output using a first hysteresis function in response to the determined direction being a first direction, and using a second hysteresis function in response to the determined direction being a second direction.

In another aspect, the motor controller is further configured to generate the output using a third hysteresis function in response to the determined direction being a transition from the first direction to the second direction, and using a fourth hysteresis function in response to the determined direction being a transition from the second direction to the first direction.

In another aspect, the first direction is a trigger depression direction, and the second direction is a trigger release direction.

In another aspect, the power tool further includes a communication interface configured to receive data from one or more external devices.

In another aspect, the motor controller is further configured to modify the one or more hysteresis functions based on the received data.

Power tools described herein include a housing, a trigger, a motor coupled to an output member, a motor drive circuit coupled to the motor, and a motor controller coupled to the motor drive circuit. The motor controller is configured to detect a position change of the trigger, determine one or more parameters associated with the position change, generate an output based on the one or more determined parameters and a trigger map, transmit the output to the motor drive circuit, apply one or more trigger mapping adjustment functions to modify the trigger map, and update the trigger map based on the applied trigger mapping function.

In one aspect of the above embodiment, the one or more trigger mapping adjustment functions include a spline function.

In another aspect, the one or more trigger mapping adjustment functions include a cumulative density function.

In another aspect, the one or more trigger mapping adjustment functions include a reinforcement learning function.

In another aspect, the power tool further includes a communication interface configured to receive a user input from one or more external devices.

In another aspect, the one or more trigger mapping adjustment functions are selected based on the received user input.

In another aspect, the received user input is configured to modify one or more parameters of the trigger mapping adjustment function.

Power tools described herein include a housing, a trigger, a motor coupled to an output member, a motor drive circuit coupled to the motor, and a motor controller coupled to the motor drive circuit. The motor controller is configured to detect a position change of the trigger, determine one or more parameters associated with the position change, generate an output based on the one or more determined parameters and a variable trigger mapping function, and transmit the output to the motor drive circuit.

In one aspect of the above embodiment, the variable trigger mapping function is a hysteresis function.

In another aspect, the hysteresis function is one of a linear function, a polynomial function, a piecewise function, a lookup table function, a discrete function, and a continuous function.

In another aspect, the variable trigger mapping function is one of a spline function, a cumulative density function, and a reinforcement learning function.

In another aspect, the power tool further includes a communication interface configured to receive a user input from one or more external devices.

In another aspect, the variable trigger mapping function is selected based on the received user input.

In one embodiment, a method for controlling an output of a power tool is described. The method includes detecting a position change of a trigger of the power tool, determining a distance and direction of the detected position change by a motor controller of the power tool, and generating, at the motor controller, an output using one or more hysteresis functions based on the determined distance and determined direction. The method further includes transmitting the output to a motor drive circuit of the power tool by the motor controller.

In one aspect of the above embodiment, the hysteresis function is one of a linear function, a polynomial function, a piecewise function, a lookup table function, a discrete function, and a continuous function.

In another aspect, generating the output includes using a first hysteresis function in response to the determined direction being a first direction, and using a second hysteresis function in response to the determined direction being a second direction to generate the output.

In another aspect, generating the output further includes generating the output using a third hysteresis function in response to the determined direction being a transition from the first direction to the second direction, and using a fourth hysteresis function in response to the determined direction being a transition from the second direction to the first direction.

In one embodiment, a method for controlling an output of a power tool is described. The method includes detecting a position change of a trigger of the power tool, determining one or more parameters associated with the detected position change, and generating an output based on the one or more determined parameters and a trigger map. The method also includes transmitting the output to the motor drive circuit, applying one or more trigger mapping adjustment functions to modify the trigger map, and updating the trigger map based on the applied trigger mapping function.

In one aspect of the above embodiment, the one or more trigger mapping adjustment functions include one or more of a spline function, a cumulative density function, and a reinforcement learning function.

In one embodiment, a method for controlling an output of a power tool by a motor controller is described. The method includes detecting a position of the trigger of the power tool, determining one or more parameters associated with the position change, and generating an output based on the one or more determined parameters and a variable trigger mapping function. The method further includes transmitting the output to the motor drive circuit.

In one aspect of the above embodiment, the variable trigger mapping function is a hysteresis function.

In another aspect, the hysteresis function is one of a linear function, a polynomial function, a piecewise function, a lookup table function, a discrete function, and a continuous function.

In another aspect, the variable trigger mapping function is one of a spline function, a cumulative density function, and a reinforcement learning function.

Before any embodiments are explained in detail, it is to be understood that the embodiments are not limited in application to the details of the configuration and arrangement of components set forth in the following description or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software-based devices, as well as a plurality of different structural components, may be utilized to implement the embodiments. For example, "servers," "computing devices," "controllers," "processors," etc., described in the specification can include one or more processing units, one or more computer-readable medium modules, one or more input/output interfaces, and various connections (e.g., a system bus) connecting the components.

Relative terminology, such as, for example, "about," "approximately," "substantially," etc., used in connection with a quantity or condition would be understood by those of ordinary skill to be inclusive of the stated value and has the meaning dictated by the context (e.g., the term includes at least the degree of error associated with the measurement accuracy, tolerances [e.g., manufacturing, assembly, use, etc.] associated with the particular value, etc.). Such terminology should also be considered as disclosing the range defined by the absolute values of the two endpoints. For example, the expression "from about 2 to about 4" also discloses the range "from 2 to 4". The relative terminology may refer to plus or minus a percentage (e.g., 1%, 5%, 10%, or more) of an indicated value.

It should be understood that although certain drawings illustrate hardware and software located within particular devices, these depictions are for illustrative purposes only. Functionality described herein as being performed by one component may be performed by multiple components in a distributed manner. Likewise, functionality performed by multiple components may be consolidated and performed by a single component. In some embodiments, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links. Similarly, a component described as performing particular functionality may also perform additional functionality not described herein. For example, a device or structure that is "configured" in a certain way is configured in at least that way but may also be configured in ways that are not explicitly listed.

Other aspects of the embodiments will become apparent by consideration of the detailed description and accompanying drawings.

DETAILED DESCRIPTION

Figure 1:
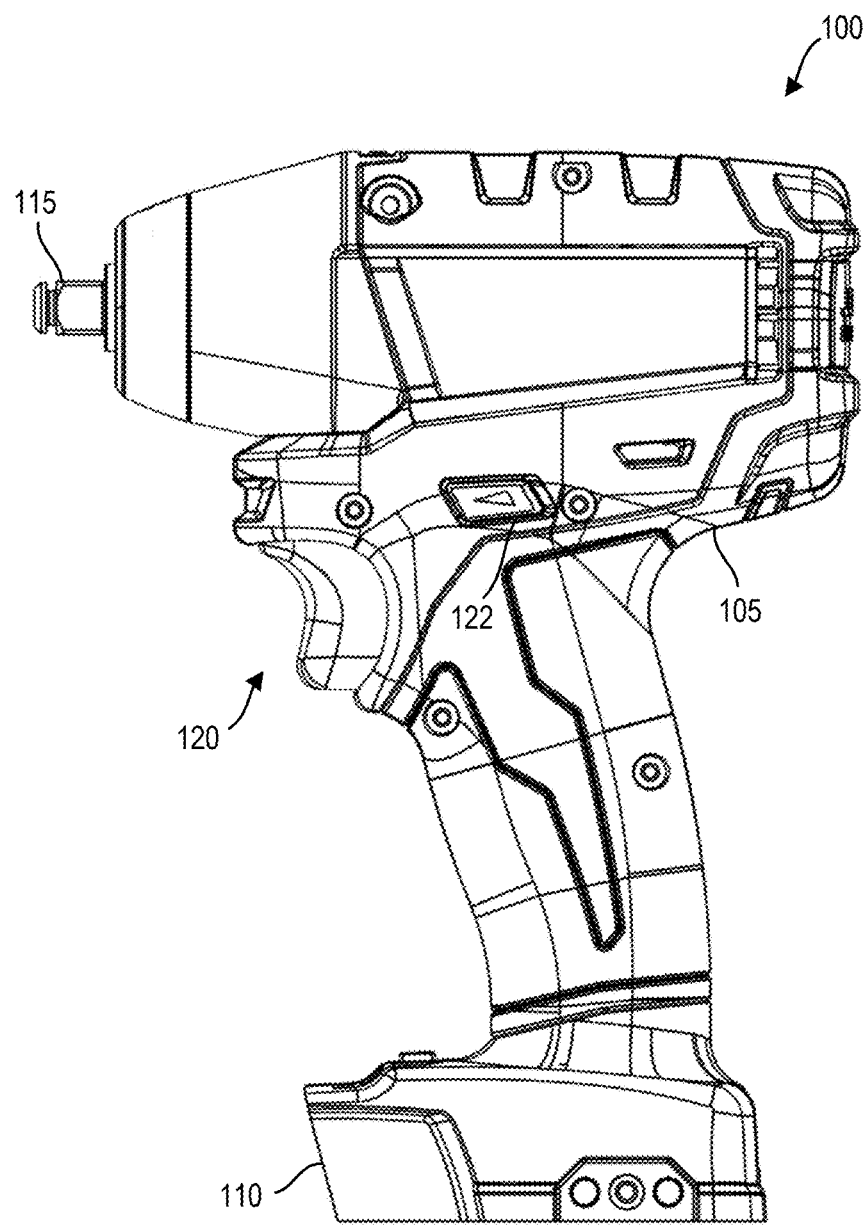
FIG. 1 is a perspective view of a power tool including a trigger, according to some embodiments.

FIG. 1 illustrates an example power tool 100, according to one embodiment. The power tool includes a housing 105, a battery pack interface 110, a driver 115 (e.g., a chuck or bit holder), and an input, such as a trigger assembly 120. The power tool 100 may further have a forward-reverse selector 122, which can allow a user to control the direction of a rotating portion of the tool. The power tool 100 may furthermore have a mode selector input or other user interface elements, such as a clutch ring, a gear selector, a speed selector, and the like. In other embodiments, the power tool 100 may further include various sensors, such as motion sensors (e.g., gyroscope and/or accelerometer) to provide information to a controller of the power tool 100 (described below) related to an orientation (e.g., up, horizontal, down, etc.) or movement of the power tool 100. The orientation information may be associated with a user's typical grip, which may be used when determining one or more trigger mapping profiles. For example, an overhead use-case may tend to encourage a stronger grip for which a trigger mapping may compensate by having less output for the same distance traveled.

While FIG. 1 shows a specific power tool with a rotational output, it is contemplated that the herein described trigger mapping operations may be used with multiple types of power tools, such as drills, drivers, impact drivers, impulse drivers, saws (e.g. band saws, circular saws, miter saws, and the like), lights, hammer drills, nail guns, staple guns, liquid dispenser (e.g. caulk guns), crimping and/or clamping devices, or another type of power tool that uses a brushless DC motor that is controlled via a user input (e.g. a trigger).

Figure 2:
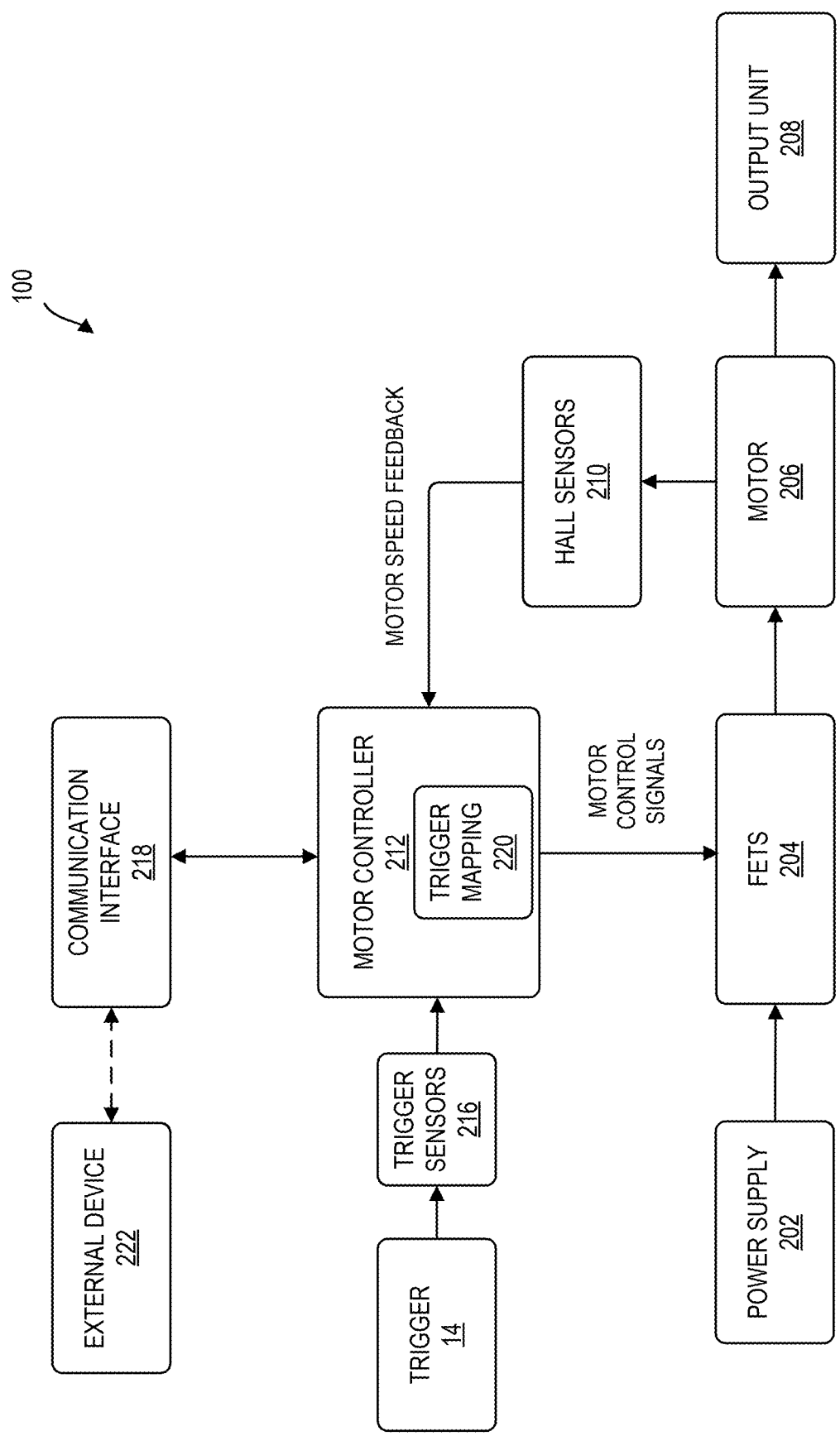
FIG. 2 is a block diagram of a power tool control system, according to some embodiments.

FIG. 2 is a block diagram of the example power tool 100 of FIG. 1. The power tool 100 includes a power supply 202, a motor drive circuit 204, such as field effect transistors (FETs), a motor 206, an output unit 208 (e.g., driver 115) Hall effect sensors 210, a motor controller 212, a trigger 214, one or more trigger sensors 216, and a communication interface 218. The Hall effect sensors 210 provide motor information feedback to the motor controller 212, such as motor rotational position information, which can be used by the motor controller 212 to determine position, velocity, and/or acceleration of the motor 206. In one embodiment, other sensing techniques, such as back-emf sensing may allow for determination of motor rotation speed without the need for Hall effect sensors 210.

The trigger 214 is a user input mechanism and may be all or part of the trigger assembly 120 shown in FIG. 1. However, other input mechanisms having a user apply a force to actuate may also be used as in lieu of the trigger 214. The trigger sensors 216 may include one or more sensors for determining an amount of actuation applied to the trigger 214 by a user. In some embodiments, trigger sensors 216 may include one or more Hall effect sensors configured to measure a movement (i.e., change in position) of the trigger 214 based on a change in a detected magnetic field. In other embodiments, other sensors, such as pressure sensors, may be configured to measure a force applied to the trigger assembly 120. Other sensor types, such as rotary encoders, optical encoders, force sensors, resistive sensors, capacitive sensors, inductive sensors, and the like may also be used to determine a force and/or movement of the trigger 214. The trigger sensors 216 are configured to generate an output which is provided to the motor controller 212.

The motor controller 212 includes an electronic processor and a memory storing instructions that, when executed by the electronic processor, cause the motor controller 212 to carry out the functionality of the controller described herein. For example, the memory of the motor controller 212 may include a trigger mapping application 220, which may include instructions configured to perform the various trigger mapping algorithms described herein. The motor controller 212 is configured to receive input from the trigger sensors 216 for varying the motor speed and thus the speed of an accessory attached to the output shaft 130. The motor controller 212 is also configured to receive inputs from the communication interface 218, such as trigger mapping profiles, and the like.

The communication interface 218 may be configured to receive an input from one or more external devices 222. The external device 222 may be one or more of a personal computer, a table computer (e.g., iPad®, Android Tablet®, etc.), a smartphone (e.g., iPhone®, an Android® phone, a Windows® Phone, etc.), and/or a dedicated programming device configured to interface with the power tool 100. In some embodiments, the communication interface 218 is configured to communicate using one or more wired communication protocols, such as USB, USB-C, Firewire, Lightening, Serial (e.g., RS-232), ethernet, and/or other wired communication protocols. In other embodiments, the communication interface 218 is configured to communicate using one or more wireless communication protocols, such as Bluetooth, Bluetooth Low Energy ("BLE"), LoRA, Wi-Fi, Wi-Max, RF, Near Field Communication ("NFC"), and/or other wireless communication protocols.

In some embodiments, the motor 206 is controlled electronically rather than using a gear box or mechanical controls. In response to the motor information feedback from the Hall effect sensors 210 and user control input from the trigger 214, the motor controller 212 transmits control signals to accurately control the motor drive circuit 204 to drive the motor 206. By selectively enabling and disabling the motor drive circuit 204, power received from the power supply 202 is selectively applied to the motor 206 to cause rotation of a rotor of the motor 206. The rotating rotor of the motor 206 drives the output unit 208. In some embodiments, the motor speed indicated by the output of the Hall effect sensors 210 enables the motor controller 212 to implement closed loop speed control. The closed loop speed control enables the motor controller 212 to adjust motor power to maintain an RPM selected by the trigger 214, as a load on the motor 206 varies during an operation. For example, using the closed loop speed control, the motor controller 212 may increase motor power to maintain a selected maximum RPM when a load is increased. The control signals sent by the motor controller 212 to the motor drive circuit 204 may comprise pulse width modulation (PWM) signals that drive the speed of the motor 206 based on a duty cycle of the PWM signals.

Although not shown, the motor controller 212 and other components of power tool 100 are electrically coupled to and receive power from the power supply 202. In some embodiments, the power supply 202 comprises one or more lithium-ion battery packs. In one example, the power supply 202 comprises 18V lithium-ion battery packs. However, lithium-ion battery packs of more than 18V or less than 18V are also considered. In other embodiments, the power supply 202 may be other energy storage devices, such as alkaline batteries, lead acid batteries, nickel metal hydride batteries, etc. In still further embodiments, the power supply 202 may be an AC power source, such as provided by a utility.

Figure 3:
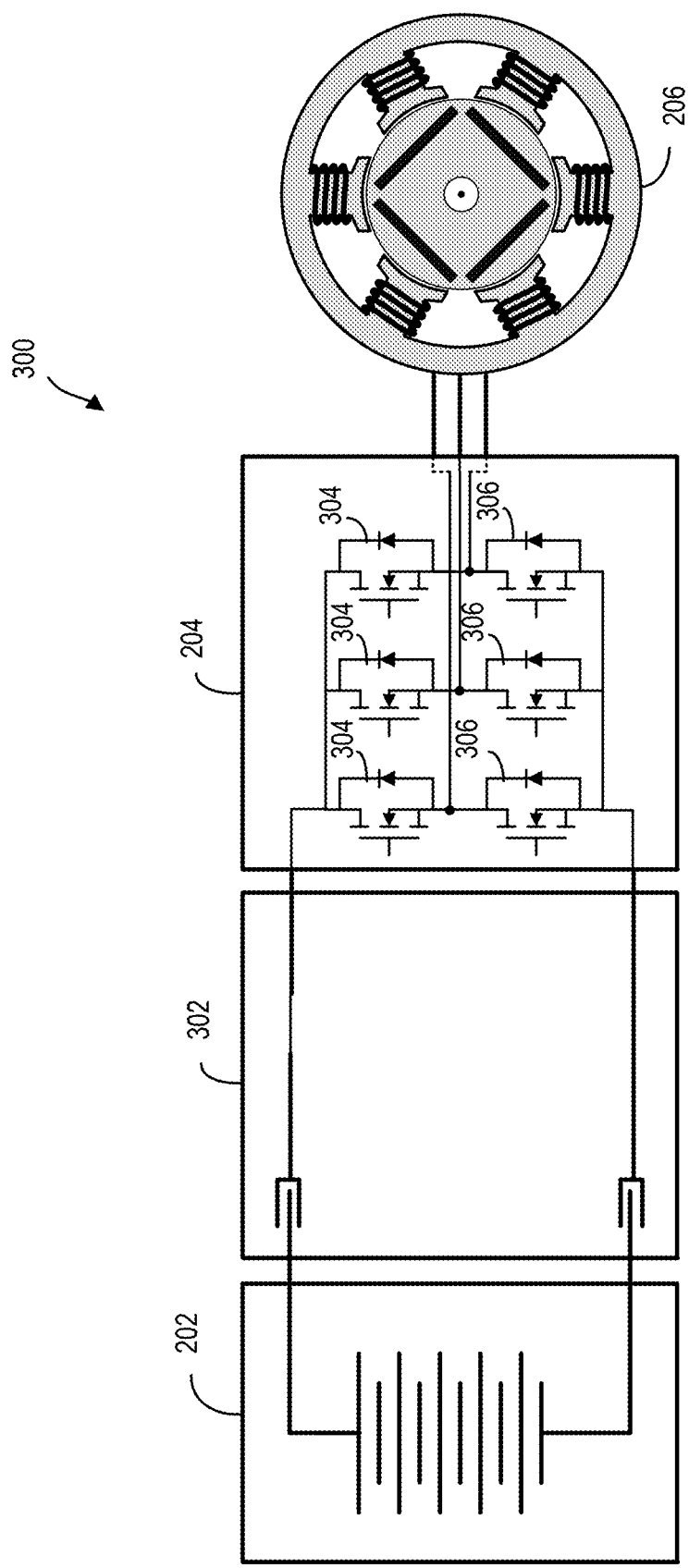
FIG. 3 is a circuit diagram of a power switching network, according to some embodiments.

FIG. 3 illustrates a circuit diagram of a motor driving circuit 300. The motor driving circuit 300 is described with respect to the power tool 100, and includes the power supply 202, the motor drive circuit 204 and the motor 206. The power supply 202 is coupled to the power tool 100 via a power connection 302. In one embodiment, the power connection 302 is the battery pack interface 110 described above. The motor drive circuit 204 includes a number of high side power switching elements 304 (e.g., field effect transistors [FETs]) and a number of low side power switching elements 306 (e.g., FETs). The motor controller 212 provides the control signals to control the high side power switching elements 304 and the low side power switching elements 306 to drive the motor 206 based on the motor feedback information and user controls described above. For example, in response to detecting a pull of the trigger 214, the motor controller 212 provides the control signals to selectively enable and disable the power switching elements 304 and 306 (e.g., sequentially, in pairs) resulting in power from the power supply 202 to be selectively applied to stator coils of the motor 206 to cause rotation of a rotor. More particularly, to drive the motor 206, the motor controller 212 enables a first high side power switching element 304 and first low side power switching element 306 pair (e.g., by providing a voltage at a gate terminal of the power switching elements) for a first period of time. In response to determining that the rotor of the motor 206 has rotated based on a pulse from the Hall effect sensors 210, the motor controller 212 disables the first power switching element pair and enables a second high side power switching element 304 and a second low side power switching element 306. In response to determining that the rotor of the motor 206 has rotated based on pulse(s) from the Hall effect sensors 210, the motor controller 212 disables the second power switching element pair and enables a third high side power switching element 304 and a third low side power switching element 306. This sequence of cyclically enabling pairs of high side power switching elements 304 and low side power switching elements 306 repeats to drive the motor 206. Further, in some embodiments, the control signals include pulse width modulation (PWM) signals having a duty cycle that is set according to the amount of trigger pull of the trigger 214 (as indicated by the output of the trigger sensors 216), to thereby control the speed or torque of the motor 206.

Figure 4:
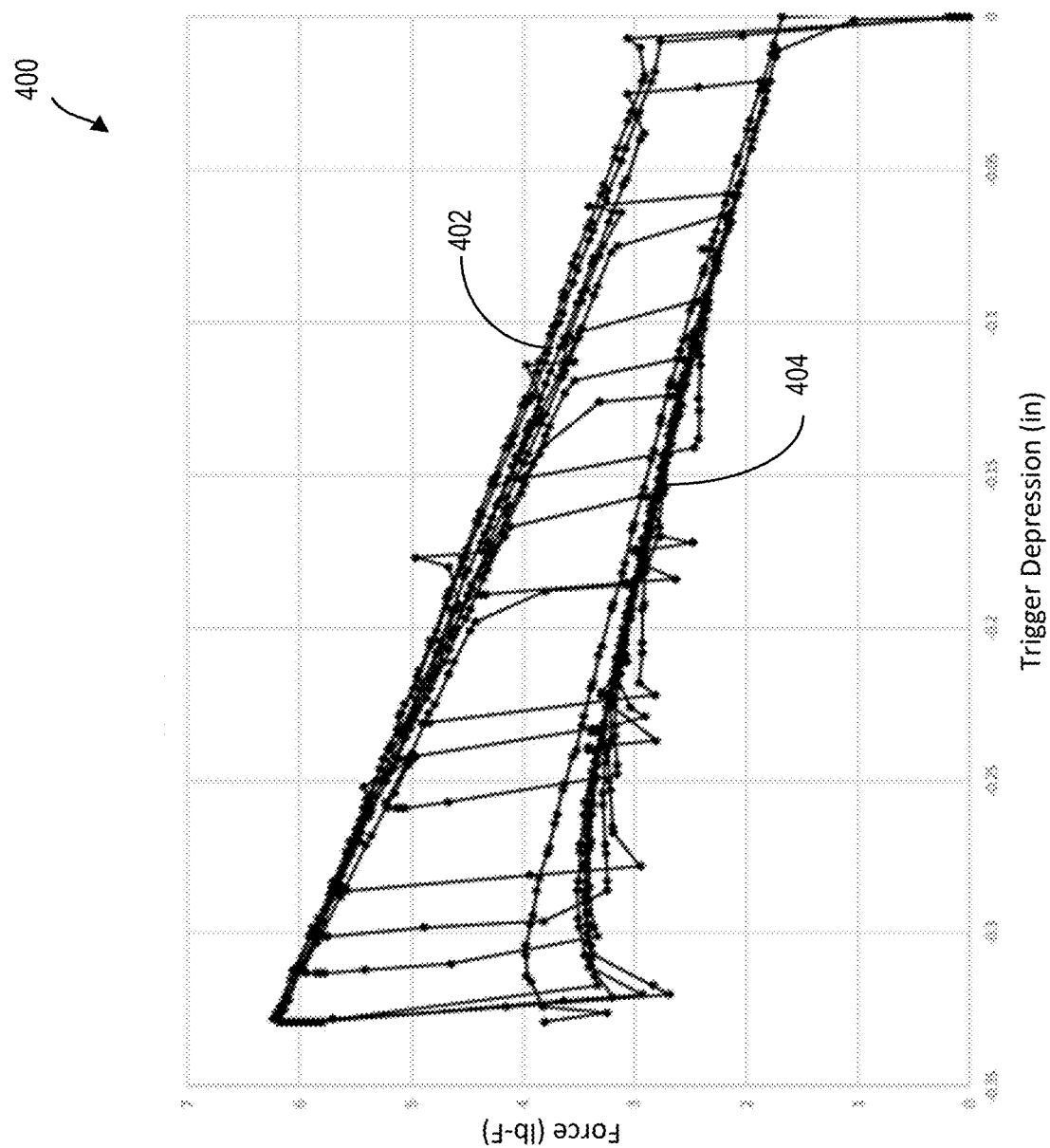
FIG. 4 is a graph illustrating a trigger force vs. distance mapping, according to some embodiments.

Generally, when a trigger, such as trigger 214, is actuated, the motor controller 212 uses one or more predefined trigger mapping functions or profiles to generate an output which is then used to drive the motor 206. Historically, these mappings have been functions that directly map the trigger depression output to a target value. The output of the trigger 214 is generated by the one or more trigger sensors 216 and generally processed by the motor controller 212 using an analog-to-digital converter ("ADC"). However, in some embodiments, the trigger sensors 216 may include the ADC circuitry. The motor controller 212 then attempts to control the motor 206 to reach the target value. In some examples, the motor controller 212 may implement a ramp function to avoid overloading the motor drive circuit 204. However, forces such as friction (both static and kinetic) and resistive forces (e.g., pressure due to a sealed compartment within the trigger assembly 120) can cause the force applied to the trigger 214 to not be a direct function of the trigger depression distance. Specifically, the trigger 214 may exhibit a hysteresis effect for which the force required to further depress the trigger 214 or further release the trigger 214 may differ for a same depression distance. This is shown in FIG. 4, which shows a force vs. depression dataset 400 for the depression of the trigger 214 (shown as top-line dataset 402) and a force vs. position dataset for the release of the trigger 214 (shown as bottom-line dataset 404). As shown in FIG. 4, there is a distinct difference between the depression and the release dataset. Thus, the direction of travel can cause a significant offset or switch in the profile of the force required to actuate the trigger. These differences may be further caused by factors such as trigger designs, tolerances, finger location, etc. Additionally, as further shown in FIG. 4, intermediate transitions in both the depression and release operations may exist. These differences between depression and release can result in trigger maps and subsequent outputs that do not accurately reflect the intent of the user where they are based only on position or force.

Figure 5:
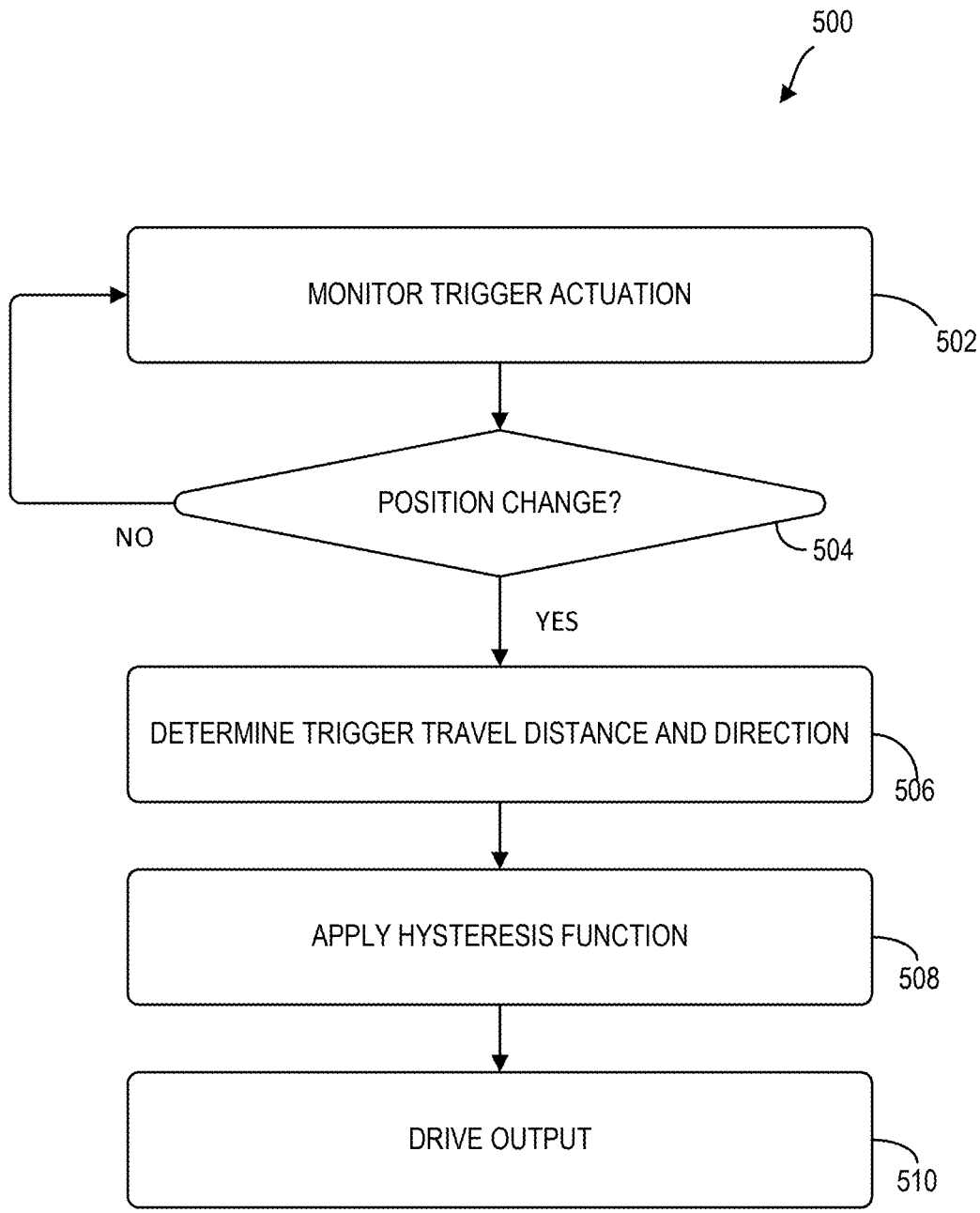
FIG. 5 is a flow chart illustrating a process for trigger mapping using hysteresis, according to some embodiments.

Turning to FIG. 5, a flowchart illustrating a process 500 for integrating direction-based hysteresis into a trigger mapping profile is shown, according to some embodiments. At process block 502, a position of the trigger 214 is monitored. In some examples, various parameters such as position, force, pressure, etc. may be monitored, such as via the trigger sensors 216. At process block 504, the motor controller 212 determines whether a position of the trigger 214 has changed based on the monitored parameters of the trigger 214. In response to determining that the position of the trigger 214 has not changed, the motor controller 212 continues to monitor the trigger position at process block 502. In some embodiments, the position of the trigger 214 may be determined to change when one or more values exceeds a predetermined value. For example, a movement of more than 1% of total position range may be required to determine whether a position change has occurred. However, values of more than 1% or less than 1% may also be required to determine whether a position change has occurred.

In response to determining that a change in position of the trigger 214 has occurred, one or more trigger parameters are determined at process block 506. In some embodiments, the distance of travel and direction of travel of the trigger 214 are measured. The motor controller 212 may measure the trigger parameters based on the data provided via the trigger sensors 216. In some examples, one or more filters may be used between the trigger sensors 216 and the motor controller 212 to reduce errors related to ADC noise, vibrations, etc. In some embodiments, the motor controller 212 determines whether the trigger 214 is in a transition state, such as from depression to release, or from release to depression.

At process block 508, one or more hysteresis functions are applied to the trigger parameters to generate an output to the motor drive circuit 204. In one embodiment, the hysteresis function is determined based on a direction of the trigger movement (e.g., depressing or releasing). For example, a first hysteresis function may be applied when the trigger 214 is determined to be moving in a depressing direction, and a second function may be applied when the trigger 214 is determined to be releasing (e.g., moving in a releasing direction). The hysteresis function determines an output value provided to the motor drive circuit 204. In one example, the hysteresis functions may be described as shown below in Equation 1.

$$\text{output} \sim \begin{cases} f(x) & \text{if depressing} \\ g(x) & \text{if releasing} \end{cases} \quad \text{EQN. 1}$$

In some embodiments, additional hysteresis functions may be used when the trigger 214 is determined to be in transition. For example, a third hysteresis function may be applied when the trigger 214 is transitioning from depression to releasing, and a fourth hysteresis function may be applied when the trigger 214 is transitioning from releasing to depression, as shown below in Equation 2.

$$\text{output} \sim \begin{cases} f(x) & \text{if not transition, depressing} \\ g(x) & \text{if not transition, releasing} \\ h(x) & \text{if transition, depressing} \\ i(x) & \text{if transition, releasing} \end{cases} \quad \text{EQN. 2}$$

The hysteresis functions may be various functions, such as linear functions, polynomial functions, piecewise functions, lookup-based functions, discrete functions, continuous functions, state-based functions, and/or other functions for a given application. In some embodiments, the hysteresis function may be a combination of functions. In still other embodiments, the hysteresis function may be used in conjunction with one or more trigger output maps to generate a desired output. Another possible hysteresis function may be a hysteresis function that limits the rate of distance changes to a rate of output changes to avoid large jumps in the output but increases responsiveness as observed by the user. Additionally, hysteresis functions may be used to provide additional filtering to an input from the trigger 214, such as to avoid analog noise and/or small perturbations due to vibrations or slight variations in input by a user. These hysteresis functions, for example, may apply a hysteresis block on the inputs from the trigger sensors 216 such that such small movements do not cause large jumps in the output. Additionally, output filters such as ramps, low pass filters, second order filters, etc., may be used on the outputs of the hysteresis functions to avoid large variations in the output.

In some examples, a user may be able to modify the hysteresis function values to balance responsiveness vs. smoothness and control. Modifications may include varying the hysteresis function type (e.g., linear, polynomial, etc.), one or more parameters or operators within a hysteresis function, etc. In some embodiments, a user may be able to modify the hysteresis values using an external device, such as external device 222, and transmit the values to the power tool 100 via the communication interface 218. In some embodiments, a user may be able to move a spline or other trend line using the external device to vary one or more hysteresis function values. Upon applying the one or more hysteresis functions, an output is generated and provided to the motor drive circuit 204 at process block 510.

In some examples, power tool triggers, such as trigger 214, may have various limitations, such as reduced accuracy due to noisy ADCs, user reaction time, and/or a wide variety of user preferences for responsiveness. In particular, users may have a desire to customize trigger mapping (i.e., the output of the tool based on the input at the trigger 214), such that sensitivity and depression with respect to output values can be varied. In some examples, a user may be able to select (or the power tool 100 may operate between) two or more different trigger maps. For example, the user may be able to select a trigger map on the power tool 100 or via the external device 222. In some embodiments, the user may be able to select a trigger map for a specific mode, gear, or identified application of the power tool.

Figure 6:
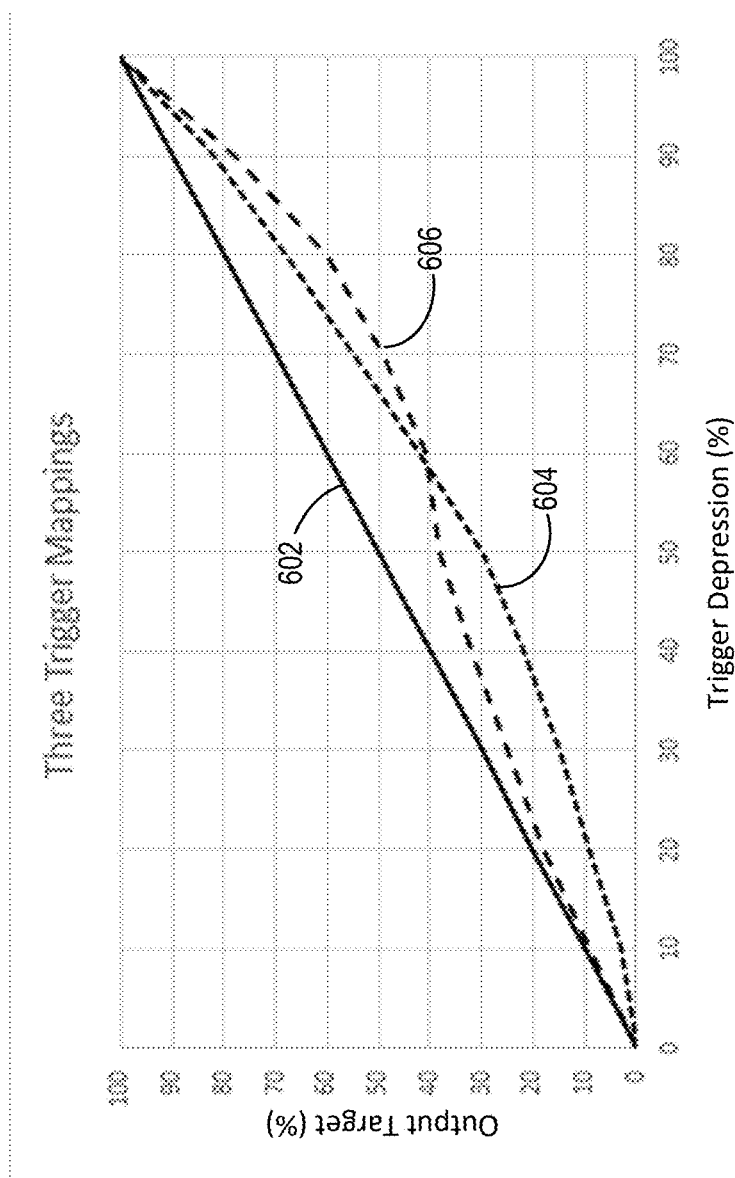
FIG. 6 is a graph illustrating various trigger mapping profiles, according to some embodiments.

Turning to FIG. 6, three separate trigger maps are shown, according to some embodiments. A linear map 602 may be suitable for users that desire a smooth output response where there is a similar level needed of control over an entire output target range. A concave map 604 may be suitable for users that desire finer control of the output target value at lower target outputs. This may be useful for seating small fasteners with tools that can also exert significant output force/torque. Finally, an inflection map 606 is a unique map that allows a user fine control at a midrange of the tool output. Accordingly, different users may use a tool, such as power tool 100, at different typical operating ranges, may desire different levels of control at different operating ranges, and may prioritize smoothness vs. response differently. As such, a user may want to modify mapping parameters themselves.

Figure 7:
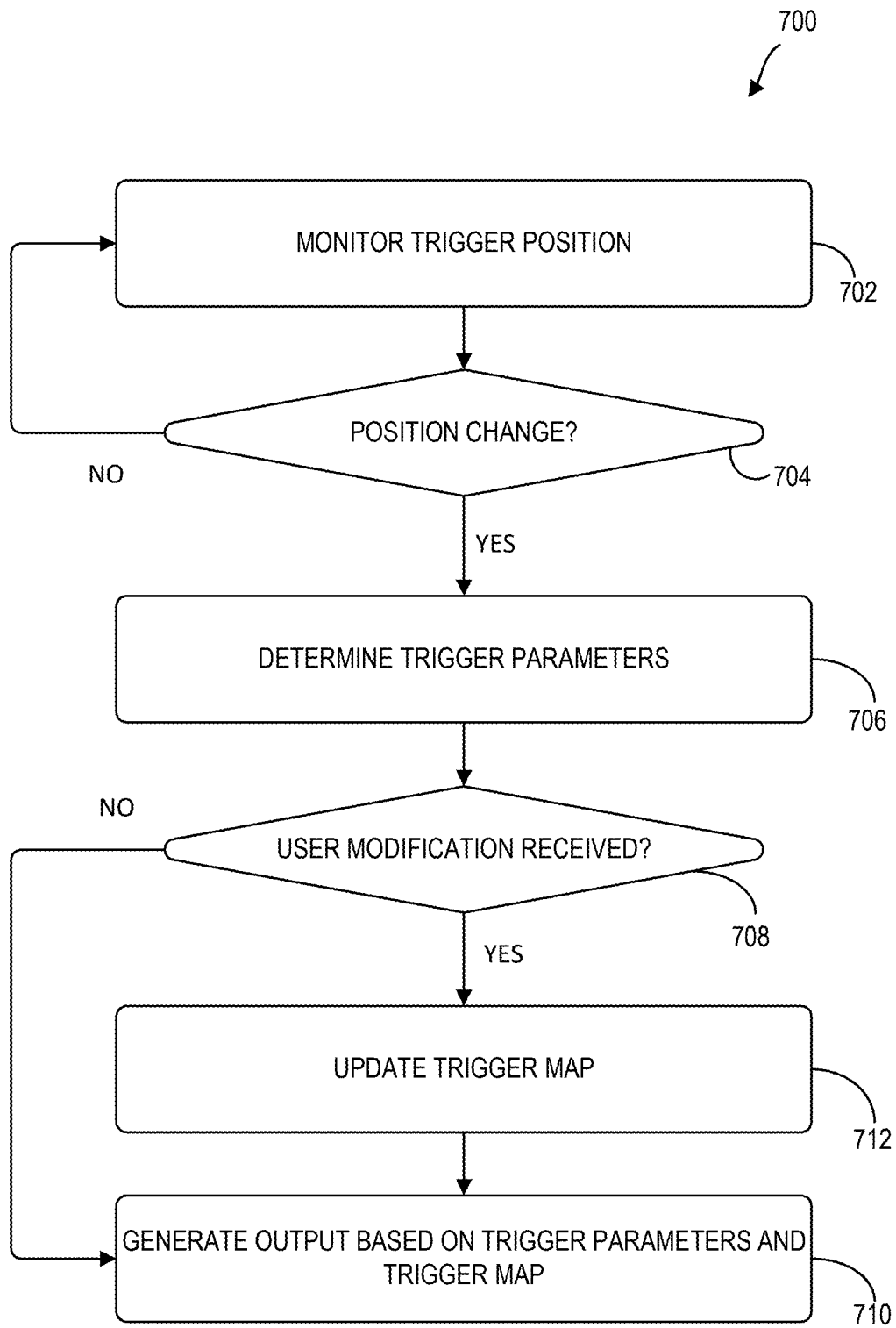
FIG. 7 is a flow chart illustrating a process for controlling or selecting a trigger map, according to some embodiments.

Turning to FIG. 7, a flow chart illustrating a process 700 for implementing user-modified trigger maps is shown, according to some embodiments. At process block 702, a position of the trigger 214 is monitored. In some examples, various parameters such as position, force, pressure, etc., may be monitored (e.g., via the trigger sensors 216). At process block 704, the motor controller 212 determines whether a position of the trigger 214 has changed based on the monitored parameters of the trigger 214. In response to determining that the position of the trigger 214 has not changed, the motor controller 212 continues to monitor the trigger position at process block 702. In some embodiments, the position of the trigger 214 may be determined to change when one or more values exceeds a predetermined value. For example, a movement of more than 1% of total position range may be required to determine whether a position change has occurred. However, values of more than 1% or less than 1% may also be required to determine whether a position change has occurred.

In response to determining that a change in position of the trigger 214 has occurred, one or more trigger parameters are determined at process block 706. In some embodiments, the distance of travel and direction of travel of the trigger 214 is measured. The motor controller 212 may measure the trigger 214 parameters based on the data provided via the trigger sensors 216. At process block 708, the motor controller 212, such as via the trigger mapping application 220, determines whether one or more user modifications to a trigger map have been received. As described above, the user modifications may be received by the communication interface 218, such as via an external device 222. However, in other embodiments, one or more input devices on the power tool 100 may allow a user to modify a trigger map. In some embodiments, the user may select a specific trigger map profile, modify/add/remove points within a trigger map to make a spline/piecewise/stepped functions, modify a lookup table, or custom calibrate various outputs to target trigger position values. In some examples, the user may be able to load a trigger map associated with another tool, such as via a remote application that is in communication with the power tool 100. In response to determining that no user modifications to a trigger map were received, an output is generated based on the trigger parameters and the existing trigger map at process block 710. The output is provided to the motor drive circuit 204.

In response to determining that one or more user modifications to the trigger map have been received, the trigger map is updated at process block 712. Upon updating the trigger map at process block 712, an output is generated based on the trigger parameters and the updated trigger map at process block 710. The generated output may then be provided to the motor drive circuit 204.

Figure 8:
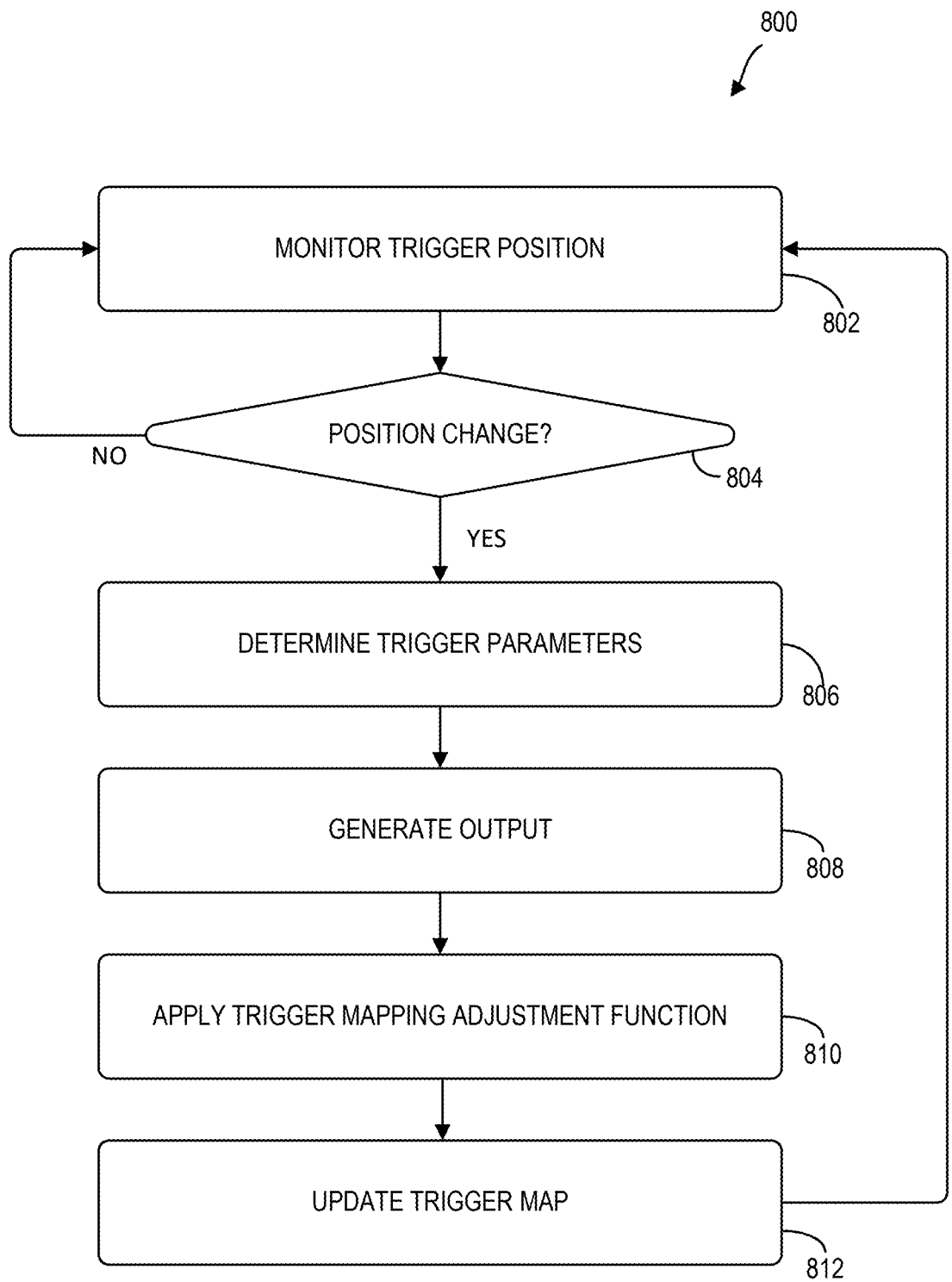
FIG. 8 is a flow chart illustrating a process for implementing one or more trigger mapping adjustment functions, according to some embodiments.

In some instances, it may be preferred to implement one or more trigger mapping algorithms on the power tool 100 to identify an ideal trigger map for a user. Turning to FIG. 8, a process 800 for automatically adjusting a trigger map is described, according to some embodiments. At process block 802, a position of the trigger 214 is monitored. In some examples, various parameters such as position, force, pressure, etc., may be monitored (e.g., via the trigger sensors 216). At process block 804, the motor controller 212 determines whether a position of the trigger 214 has changed based on the monitored parameters of the trigger 214. In response to determining that the position of the trigger 214 has not changed, the motor controller 212 continues to monitor the trigger position at process block 802. In some embodiments, the position of the trigger 214 may be determined to change when one or more values exceeds a predetermined value. For example, a movement of more than 1% of the total position range may be required to determine whether a position change has occurred. However, values of more than 1% or less than 1% may also be required to determine whether a position change has occurred.

In response to determining that a change in position of the trigger 214 has occurred, one or more trigger parameters are measured at process block 806. In one embodiment, the distance of travel and direction of travel of the trigger 214 is measured. The motor controller 212 may measure the trigger parameters based on the data provided via the trigger sensors 216. At process block 808, an output is generated based on the measured trigger parameters and a stored trigger map. The output is proved to the motor drive circuit 204.

At process block 810, a trigger mapping adjustment function is applied based on the measured parameters. In some embodiments, the trigger mapping application 220 applies the trigger mapping adjustment function. The trigger mapping adjustment function may use one or more functions or algorithms to adjust the trigger map based on various data points. In one embodiment, the trigger mapping adjustment function may implement a spline approach function to modify the trigger mapping. The spline approach function uses the average, mode, median, etc., of a trigger 214 movement during an operation to provide a numerical representation of a typical "middle" of a user's desired trigger output and/or an indication of desired sensitivity. For example, the power tool may average a characteristic middle value in operations that are not substantially run at 100%.

Figure 9:
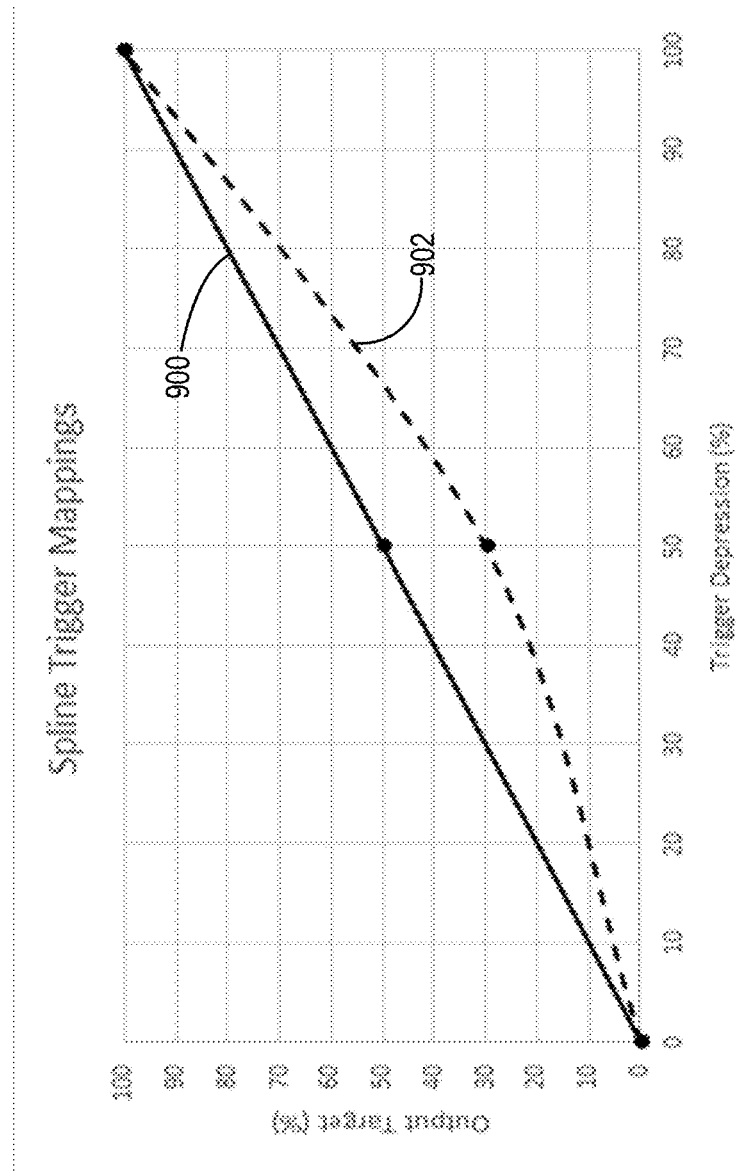
FIG. 9 is a graph illustrating a spline approach trigger mapping adjustment function, according to some embodiments.

Turning to FIG. 9, a first spline 900 and a second spline 902 of a spline approach function are formed by data points at 0% trigger depression, 50% trigger depression, and 100% trigger depression. This midpoint approach may add constraints such as binding the midpoint or adding constraints to the derivatives such that the output is sufficiently smooth. The splines in FIG. 9 represent a simplistic "mean" of output targets. In one example, a mean may use a typical operation to set the mean (or midpoint) of the spline. For example, where a user typically runs a tool at 40% PWM, the 40% PWM may be the 50% of the trigger pull, i.e., the mean of the spline. In some embodiments, the splines may account for both the mean and standard deviation of the output of the power tool. In some embodiments, the slope of the midpoint may be a function of the standard deviation of the output targets wherein a larger standard deviation relates to a larger (e.g., steeper) slope at the spline's midway point and a small standard deviation relates to a flatter slope at the spline's midway point. Such incorporation of the spread of the output may lead to splines similar to that shown in FIG. 6. Thus, the statistical values of tool's output (e.g., speed, PWM, power torque, etc.) over time may vary the trigger map to match the user operations. For example, where a user operates the tool in a narrow range (e.g., 30%-50% output), the standard deviation is small, in which case the slope of the spline may be flattened. While the above embodiment describes a "midpoint" approach, it is contemplated that one or more points on the spline may be used.

Figure 10:
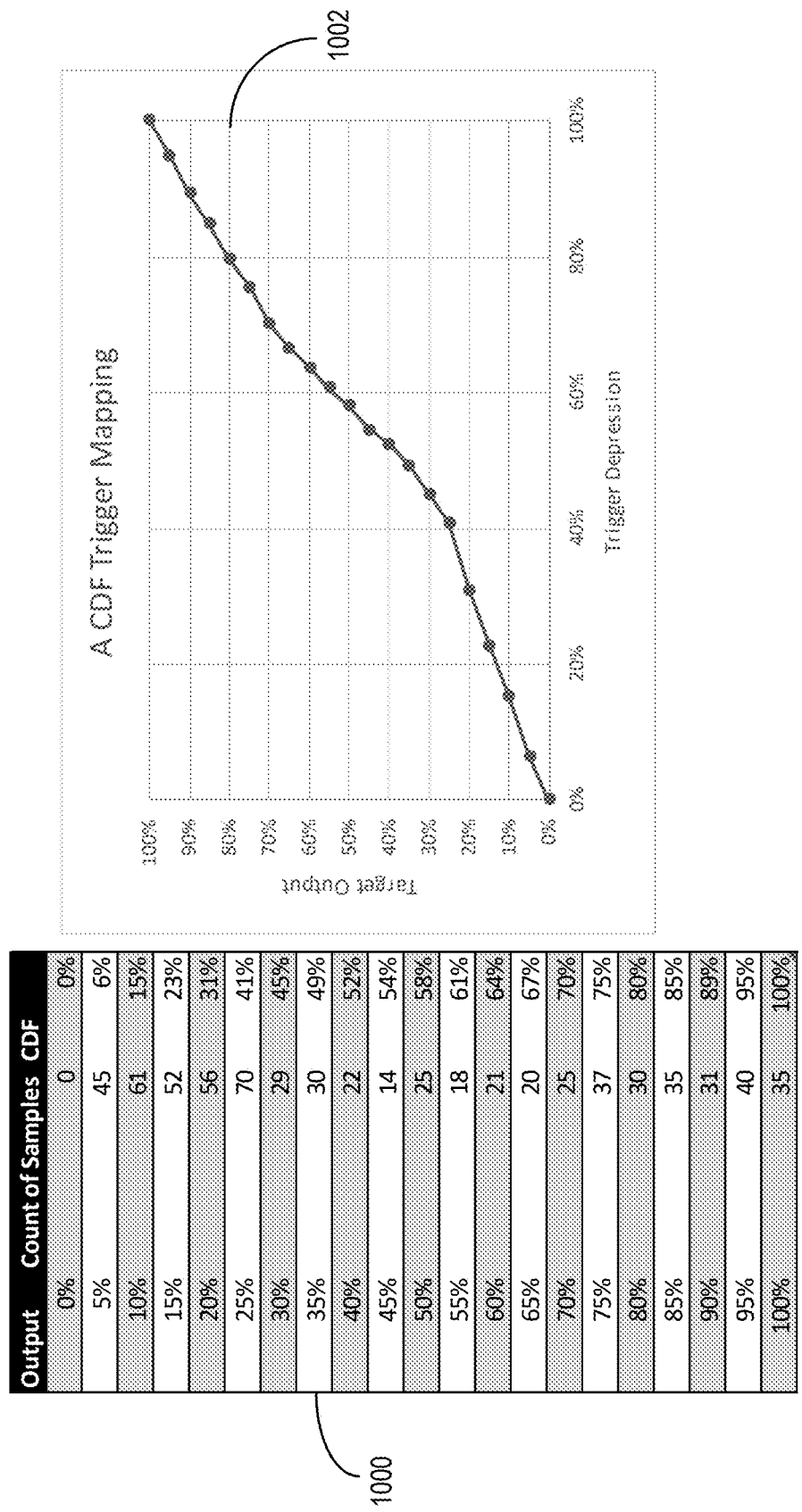
FIG. 10 is a graph illustrating a cumulative density function trigger mapping profile, according to some embodiments.

In another embodiment, the trigger mapping adjustment function may be a cumulative density function. The cumulative density function accumulates data related to power tool 100 operations, such as trigger depression, tool output, etc. The data is then mapped to an accumulation plot (e.g., histogram), also known as a cumulative density function ("CDF"). Turning to FIG. 10, a data table 1000 and an associated CDF trigger map 1002 are shown. The collected data may ideally be weighted with a standard mapping or smoothing algorithm to improve smoothness over a range of values. For instance, the motor controller 212, such as via the trigger mapping application 220, may perform a spline fit operation of the collected data. The spline fit operation may be of a particular order with fixed points, such as at (0, 0) and (1, 1). This allows for the outputs to be a characteristic output during an operation or time samples of target outputs during the operation. One or more reinforcement learning techniques, such as forgetting past samples as new ones are added, may be used to adjust to gradual shifts in user preference over time. For example, to minimize overwriting memory for parameters, the samples may be recorded with a low probability (e.g., 1%), especially once a large number of samples have been recorded. In some examples, a default starting number of samples may be employed, such as 50 samples for each range.

In still another embodiment, the trigger mapping adjustment function may include one or more reinforcement learning algorithms. Trigger mapping tends to map trigger depression directly to target output (e.g., 0% depression is 0% output, 100% depression is 100% output, etc.). For example, a trigger policy using reinforcement learning may be represented in many forms. In the most basic form, the trigger policy would be a direct trigger mapping of trigger depression directly to a target output (e.g., 0% depression is 0% output, 100% depression is 100% output, etc.) as described above. Such trigger policies could also take the form of parameterized functions like polynomials, piecewise functions, splines, etc. Alternatively, the trigger policies could take the form of a deep neural net, a table, a selection of weighted combinations or probabilistic selection among trigger mappings. In still further examples, the trigger policy may not be a one-to-one mapping of trigger depression to output, and instead may be dynamic. For example, the trigger policy may account for hysteresis and thus incorporate both direction and position of the trigger. Other dynamic trigger policies may include sliding-window deep neural network ("DNN"), sliding-window convolutional neural network ("CNN"), or a recurrent neural network ("RNN") to map to trigger positions over time to a next target output.

In one embodiment, a new mapping may be generated which is a combination or weighted average of other mapping values. The weighting may be a linear weighting or a softmax-like approach. Alternatively, the trigger mapping may be a parameterized function, or a combination of other various functions. The weighting may include various reward functions, penalty, or loss functions. For example, a penalty may be generated for small (e.g., less than 10%) overshoot and undershoots in trigger depression. Conversely, there may be a reward for the derivative of the mapping of a characteristic output of an operation (especially when the depression is less than 100% of the full depression), this allows for higher sensitivity around an operations characteristic output to be reward. For example, the reward may be generated based on small (e.g., less than 10%) overshoots and undershoots in trigger depression, as the user was capable of more quickly arriving at their ideal output. Additionally, there may be a reward for the smoothness of the trigger policy or its similarity to an expected policy. Furthermore, reinforcement learning algorithms such as e-greedy, gradient decent techniques, etc., may be used to slowly modify the trigger map over time. Deep Q-learning, SARSA, Monet Carlo, temporal difference learning, and/or genetic algorithms may also be employed.

In some embodiments, the trigger mapping adjustment function may be selected by a user, such as via the external device 222. The selected trigger mapping adjustment function may then be transmitted to the communication interface 218. In other embodiments, one or more parameters of the trigger mapping adjustment functions may be modified based on an input received from the external device 222. For example, variable parameters, constant parameters, equation types (e.g., linear, polynomial, etc.) may be modified based on an input received from the external device 222. At process block 812 the trigger map is updated based on the modified parameters.

Additional embodiments may use information about a user to modify and/or develop a trigger map for a power tool, such as power tool 100. For instance, where an application knows trade information about a user or information about their likely common use applications, the trigger mapping may be generally modified accordingly. For example, a finish carpenter may value control at lower ranges, wherein rough carpenters may value a linear profile as they typically operate tools at high speeds. HVAC technicians may desire optimization for more power control when starting self-tapping screw, such as TEK screws. The information about a user may be determined by a programming application receiving input from a user. The programming application may be on a mobile device, such as a smartphone, which may be able to communicate with the power tool 100. The information about the user may further be based on a building and information model (BIM) or scheduling software that associates when and/or where trade work may be performed or based on other tools being used by a user or jobsite. This information may result in a default trigger mapping, suggest an alternative trigger mapping to try for reinforcement learning, override an existing trigger mapping, or help in spreading refined updates on ideal trigger mappings across associated tools. In some embodiments, the user may be able to enter information, such as trade information, via an external device, such as external device 222 described above.

In some examples, the trigger mapping application 220 may determine a use application associated with a use of the power tool 100 during a first use of the power tool 100, which, as described above, may allow for the trigger map to be adjusted or modified based on the determined use application (e.g., to produce a smoother output, by ramping, by changing trigger scaling, applying a non-linear transformation, changing trigger maps, etc.). Similar to above, use applications may indicate general types of workpiece materials, fastener types, and/or desired operating profiles based on one or more factors of the determined use application. In some examples, the trigger mapping application 220 determines a use application during an initial operation of the power tool based on various sensor inputs, such as current, speed, trigger usage, voltages, tool motions, or other parameters associated with the tool and/or operation as required for a given application. In other examples, the trigger mapping application 220 may use information from previous operations to determine a likely use application. The trigger mapping application 220 may further utilize prior use data in combination with sensor inputs, such as those described above to determine the use application. The trigger mapping application 220 may further look at previous tool use within a currently determined use application to verify the use application. In still further examples, the trigger mapping application may evaluate various data provided prior to the operation of the tool, such as motion, external devices in communication with the power tool (e.g., a smartphone associated with a use with a known occupation or trade), location, or other data as appropriate for a given application. The use application may be used to generate or update trigger maps as described herein.

In some examples, the trigger mapping application 220 may use one or more machine learning applications or algorithms to determine the use application, such as by using one or more of the techniques described above. For example, the trigger mapping application 220 may utilize machine learning by implementing one or more of decision tree learning, associates rule learning, artificial neural networks, recurrent artificial neural networks, long short term memory neural networks, inductive logic programming, support vector machines, clustering, Bayesian networks, reinforcement learning, representation learning, similarity and metric learning, sparse dictionary learning, genetic algorithms, k-nearest neighbor (KNN), attention networks/transformers, and/or other machine learning applications as required for a given implementation.

Additionally, the trigger mapping application 220 may evaluate additional use data for generating/updating the trigger map as described herein. For example, determination of a user wearing gloves, user grip characteristics, workpiece information (e.g., material type, obstacles, material imperfections such as knots in wood), fastener types, driver (e.g., bit, bit size, etc.) types, whether kickback is occurring, or the like. Based on the above parameters, a trigger map for the power tool 100 may be modified, as described herein. For example, the trigger map may allow for the trigger to be more responsive near where a fastener is expected to be seated.

In some examples, the trigger mapping application 220 may modify an existing trigger mapping profile slowly to prevent a sudden change in output observed by a user. Furthermore, the trigger map may be adjusted based on a confidence level of determined use application and/or use data. For example, one or more averages (e.g., softmax) of trigger profiles may be used to generate or modify the trigger map, as described herein. This can allow for the trigger mapping profiles to be updated over time and prevent sudden output changes presented to a user.

Figure 11:
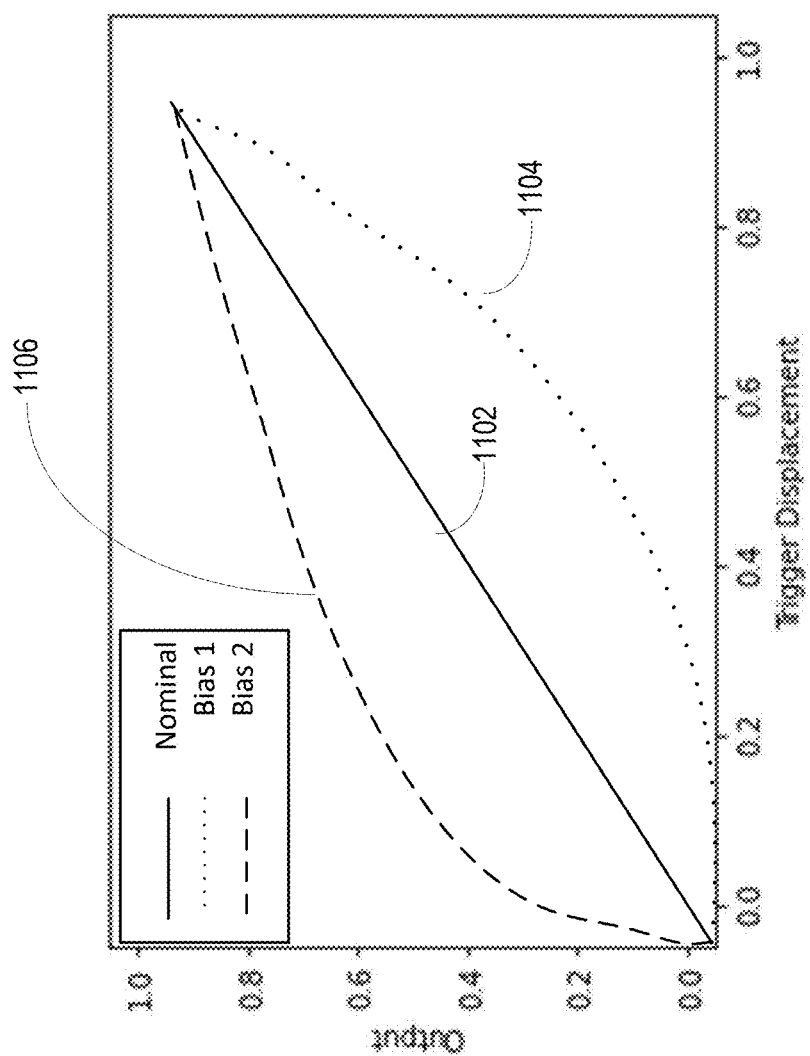
FIG. 11 is a graph illustrating a trigger map biased between two profile limits, according to some embodiments.

Turning to FIG. 11, three separate trigger maps are shown, according to some embodiments. The trigger maps may be implemented by a power tool, such as power tool 100, similarly to those described in FIG. 6, above. A linear map 1102 may be suitable for users that desire a smooth output response where there is a similar level needed of control over an entire output target range. A concave map 1104 may be suitable for users that desire finer control of the output target value at lower target outputs. This may be useful for seating small fasteners with tools that can also exert significant output force/torque. Finally, a convex map 1106 is a unique map that allows a user to quickly increase speed with minimal displacement of the trigger, while allowing for finer control in the mid and upper ranges of the trigger displacement. The convex map 1106 may be used when a user is determined to be adjusting the trigger quickly, indicating that desire reaching their end state (e.g., high speed) more quickly than when small, fine adjustments to the trigger are made.

In one embodiment a controller of the power tool, such as motor controller 212, may dynamically adjust between trigger maps, such as those shown in FIG. 11 based on one or more parameters, such as the rate of change of the trigger position. For example, the motor controller 212 may detect a rate of change of the trigger (or other input) position and bias the trigger mapping function as a function of the sign and magnitude of the rate of change of the trigger. For example, where the motor controller 212 determines that the rate of change of the trigger position is small in a positive or negative direction, the motor controller 212 may bias the trigger mapping towards the concave map 1104. Alternatively, where the motor controller 212 determines that the rate of change of the trigger position is large (e.g., exceeds a predetermined threshold) and in a positive or negative direction, the motor controller 212 may bias the trigger mapping towards the convex map 1106.

In some embodiments, the motor controller 212 may adjust the trigger mapping, such as using one or the process described above, based on determining that the application of the power tool is near completion. By changing the trigger mapping to allow for finer control of motor speed when nearing the end of an application (e.g., nearing a full seating position of a fastener, approaching a target torque value, etc.) overdriving of a fastener or other workpiece can be reduced. In one example, the motor controller 212 may determine that the application is nearing completion based on one or more sensed parameters, such as current draw, impact rate, rotational speed, etc., and automatically adjust the trigger mapping (and therefore output speed) to allow for finer control of the power tool in response to the application of the power tool nearing completion.

In some embodiments, the above trigger mapping processes described herein may be applied to an impact tool, such as an impact drive, and impact wrench, etc. There are two regimes associated with an impact driving operation: direct driving (e.g., rotation with no impact); and impact driving. Generally, all applications start in the direct drive regime, and as the output of the power tool exceeds a threshold torque due to the application, the tool transitions to the impact driving regime. However, in some applications, the output torque remains sufficiently low such that the entire application results in the power tool only operating in the direct drive regime. Accordingly, in some embodiments, the motor controller 212 may be configured to detect an application where the output torque is too low to result in the power tool switching to the impact driving regime and change a drive mode accordingly. For example, the motor controller 212 may determine whether the power tool is operating in the direct driving regime or the impact driving regime. The motor controller 212 may determine the operating regime based on current draw, motor speed, etc. The motor controller 212 may also rely on other parameters, such as whether or not the output of the power tool is free spinning with a low threshold current, whether the power tool will stay in the direct driving regime using a current and speed profile at the start of an application, etc. Based on the determinations by the motor controller 212 related to an application, one or more modifications to the output of the power tool may be performed to force the tool into the impact driving regime. For example, bursts of energy may be applied to the motor, such as by varying advance angle and/or other PWM factors. The motor controller 212 may further be configured to change a mode of the power tool 100 upon determining that the application has caused the power tool 100 to unexpectedly transition to the impact mode regime.

In some embodiments, the above-described trigger mapping profiles may be associated/used in a deceleration/braking application, such as for use with a mechanical or electronic brake. This can allow for deceleration of the output of a given power tool, such as power tool 100, to appropriately match an application and/or user preference. For embodiments using dynamic trigger mapping, as described above, dynamic deceleration/braking can further improve the operation of the tool and general user experience.

Thus, embodiments described herein provide, among other things, various trigger mapping implementations for operation of a power tool. Various features and advantages are set forth in the following claims.

What is claimed is:
1. A power tool comprising:
a housing;
a trigger;
a motor coupled to an output member;
a motor drive circuit coupled to the motor; and
a motor controller coupled to the motor drive circuit, the motor controller configured to:
detect a position change of the trigger,
determine a depression distance and a release distance corresponding to the position change,
generate an output using at least a first hysteresis function in response to the determined depression distance and a second hysteresis function in response to the determined release distance, and
transmit the output to the motor drive circuit.

2. The power tool of claim 1, wherein the first and second hysteresis functions are selected from one of a linear function, a polynomial function, a piecewise function, a lookup table function, a discrete function, and a continuous function.

3. The power tool of claim 1, wherein the motor controller is further configured to generate the output using a third hysteresis function in response to the position change being a transition from a depression to a release, and a fourth hysteresis function in response to the position change being a transition from a release to a depression.

4. The power tool of claim 1, further comprising a communication interface configured to receive data from one or more external devices.

5. The power tool of claim 4, wherein the motor controller is further configured to modify the one or more hysteresis functions based on the received data.

6. A power tool comprising:
a housing;
a trigger;
a motor coupled to an output member;
a motor drive circuit coupled to the motor; and
a motor controller coupled to the motor drive circuit, the motor controller configured to:
detect a position change of the trigger,
determine one or more parameters associated with the detected position change based on a change in a detected magnetic field, wherein the one or more parameters comprises a depression or release distance of the trigger,
inputting the one or more parameters to a trigger map to generate an output,
transmit the output to the motor drive circuit,
apply one or more trigger mapping adjustment functions to modify the trigger map, and
update the trigger map based on the applied trigger mapping function.

7. The power tool of claim 6, wherein the one or more trigger mapping adjustment functions include a spline function.

8. The power tool of claim 6, wherein the one or more trigger mapping adjustment functions include a cumulative density function.

9. The power tool of claim 6, wherein the one or more trigger mapping adjustment functions include a reinforcement learning function.

10. The power tool of claim 6, further comprising a communication interface configured to receive a user input from one or more external devices.

11. The power tool of claim 10, wherein the one or more trigger mapping adjustment functions are selected based on the received user input.

12. The power tool of claim 10, wherein the received user input is configured to modify one or more parameters of the trigger mapping adjustment function.

13. A power tool comprising:
a housing;
a trigger;
a motor coupled to an output member;
a motor drive circuit coupled to the motor; and
a motor controller coupled to the motor drive circuit, the motor controller configured to:
detect a position change of the trigger,
determine one or more parameters associated with the detected position change, wherein the one or more parameters comprises a transition state of the trigger, the transition state comprising at least of one a depressing to releasing state or a releasing to depressing state,
generate an output using a first variable trigger mapping function in response to the transition state being a depression to releasing state and a second variable trigger mapping function in response to the transition being a releasing to depressing state, and
transmit the output to the motor drive circuit.

14. The power tool of claim 13, wherein the variable trigger mapping function is a hysteresis function.

15. The power tool of claim 14, wherein the hysteresis function is one of a linear function, a polynomial function, a piecewise function, a lookup table function, a discrete function, and a continuous function.

16. The power tool of claim 13, wherein the variable trigger mapping function is one of a spline function, a cumulative density function, and a reinforcement learning function.

17. The power tool of claim 13, further comprising a communication interface configured to receive a user input from one or more external devices.

18. The power tool of claim 17, wherein the variable trigger mapping function is selected based on the received user input.

* * * * *

UNITED STATES PATENT AND TRADEMARK OFFICE
CERTIFICATE OF CORRECTION

| | | |
|---|---|---|
| PATENT NO. | : 12,489,382 B2 | Page 1 of 1 |
| APPLICATION NO. | : 18/065227 | |
| DATED | : December 2, 2025 | |
| INVENTOR(S) | : Parker McColl et al. | |

It is certified that error appears in the above-identified patent and that said Letters Patent is hereby corrected as shown below:

In the Specification

Column 13, Line 40, "e-greedy" should be --$\varepsilon$-greedy--.

Signed and Sealed this
Third Day of February, 2026

John A. Squires
*Director of the United States Patent and Trademark Office*